Figure 1:
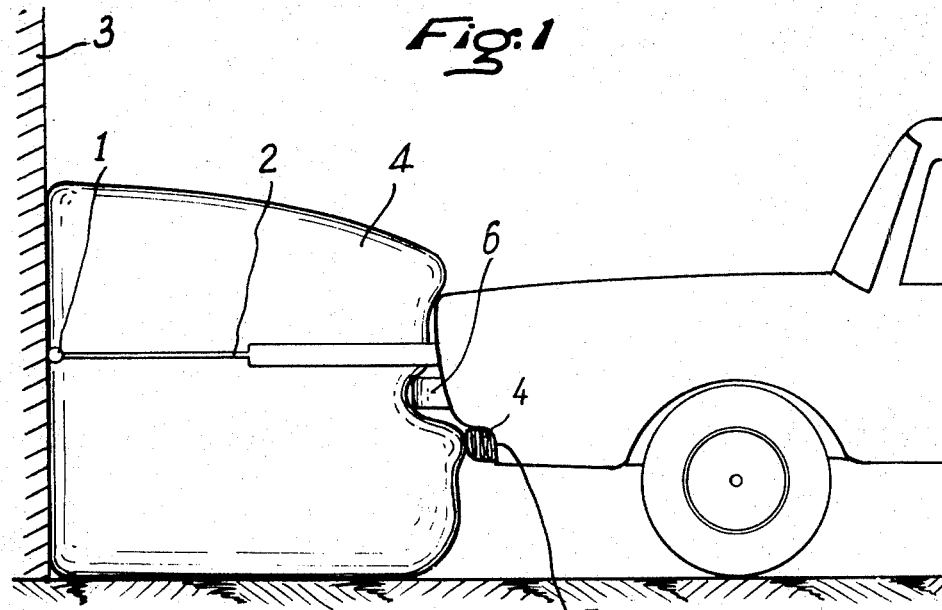

United States Patent [19]
Mercier et al.

[11] 3,822,076
[45] July 2, 1974

[54] FLUID SHOCK ABSORBING BUFFER
[75] Inventors: Jacques Mercier; André LeFeuvre, both of Billancourt, France
[73] Assignees: Regie Nationale des Usines Renault, Billancourt, France; Automobiles Peugeot, Paris, France
[22] Filed: Jan. 24, 1972
[21] Appl. No.: 220,287

[52] U.S. Cl............... 293/1, 180/92, 280/150 B, 293/4, 293/9, 293/60, 293/71 P
[51] Int. Cl..... B60r 19/10, B60r 21/02, B61f 19/04
[58] Field of Search............ 293/9, 60, 70, 71 P, 1, 293/4, 69 R; 280/150 B; 180/91, 92

[56] References Cited
UNITED STATES PATENTS

| | | | |
|---|---|---|---|
| 2,185,936 | 6/1940 | Yamada | 180/92 |
| 3,203,722 | 8/1965 | Zahorodny | 293/71 P X |
| 3,269,783 | 8/1966 | Kriz | 180/92 |
| 3,355,208 | 11/1967 | Brock | 293/9 |
| 3,588,142 | 6/1971 | Gorman | 293/1 X |
| 3,656,790 | 4/1972 | Truesdell | 293/1 |
| 3,656,791 | 4/1972 | Truesdell | 293/1 |
| 3,708,194 | 1/1973 | Amit | 293/69 X |

*Primary Examiner*—Lloyd L. King
*Assistant Examiner*—Howard Beltran
*Attorney, Agent, or Firm*—Stevens, Davis, Miller & Mosher

[57] ABSTRACT

A fluid energy absorbing buffer device for motor vehicle, of the type comprising a bag or bladder adapted to be inflated instantaneously, characterized in that said inflatable bag is folded in its inoperative condition in a cavity provided to this end on the front and/or rear portions of the vehicle, so as to be adapted to react against the chassis or any other reinforced portion of the vehicle structure, the inflation of said bag through means known per se being determined by detector members projecting from the vehicle body, said detector members being normally retracted at zero or low vehicle speeds.

2 Claims, 7 Drawing Figures

FLUID SHOCK ABSORBING BUFFER

The present invention relates to a device adapted to absorb the greater part of the kinetic energy accumulated by a running vehicle, gradually, and before the vehicle proper collides with an obstacle.

To this end, the proximity of an obstacle lying on the path, or ahead, of the vehicle, so that when the distance between the obstacle and the vehicle is inferior to a predetermined value, thus causing through suitable means the operation of the energy absorbing device so that the latter becomes operative between the obstacle and the front of the vehicle.

In the description of the invention to be given presently it will be assumed that this device comprises essentially a suitably inflated bag or bladder. However, the use of other energy absorbing means is not excluded, provided that their release is subordinate to the automatic detection of the obstacle just before it strikes the vehicle front.

Various improvements may be brought to the above-mentioned devices of this character and these improvements relate notably to a specific type of inflatable bag or bladder obtained by welding or folding the four edges bounding the contours of two sheets of elastomeric material, this bag or the like being inflatable within a net comprising non-extensible or only moderately extensible meshes, for example of nylon, possibly braided. The deflated bag is initially introduced into the net through a suitable opening, care being taken to properly position these two elements by partially inflating the bag. Then the assembly is deflated and properly folded up, and eventually introduced into the vehicle body through a suitable aperture thereof. This invention is also concerned with obstacle detectors of which two forms of embodiment, i.e. a hydraulic form and a mechanical form, will be described presently.

Reference will now be made to the attached drawing illustrating diagrammatically by way of example two forms of embodiment of energy absorbing devices according to this invention.

Figure 2:
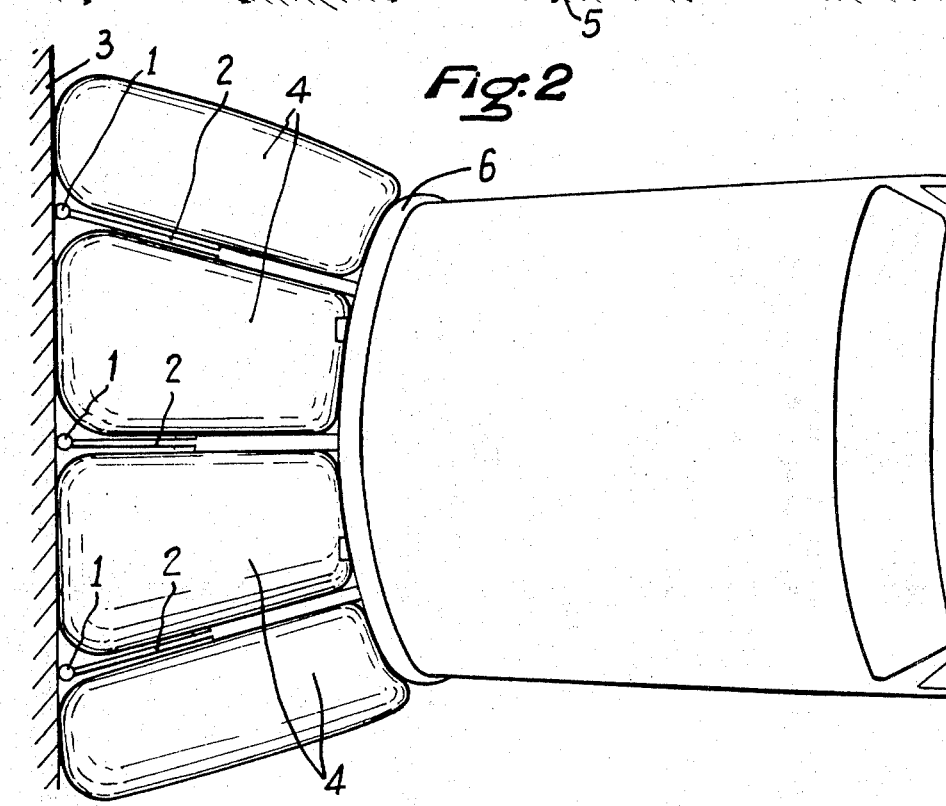
Figure 3:
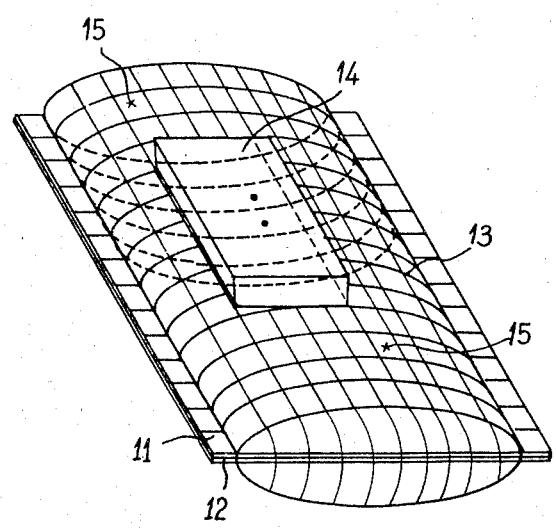
Figure 5:
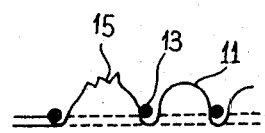
Figure 4:
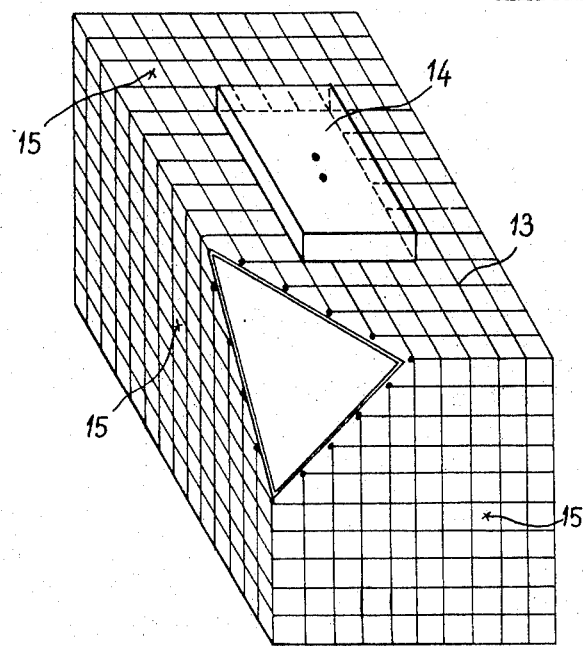
Figure 6:
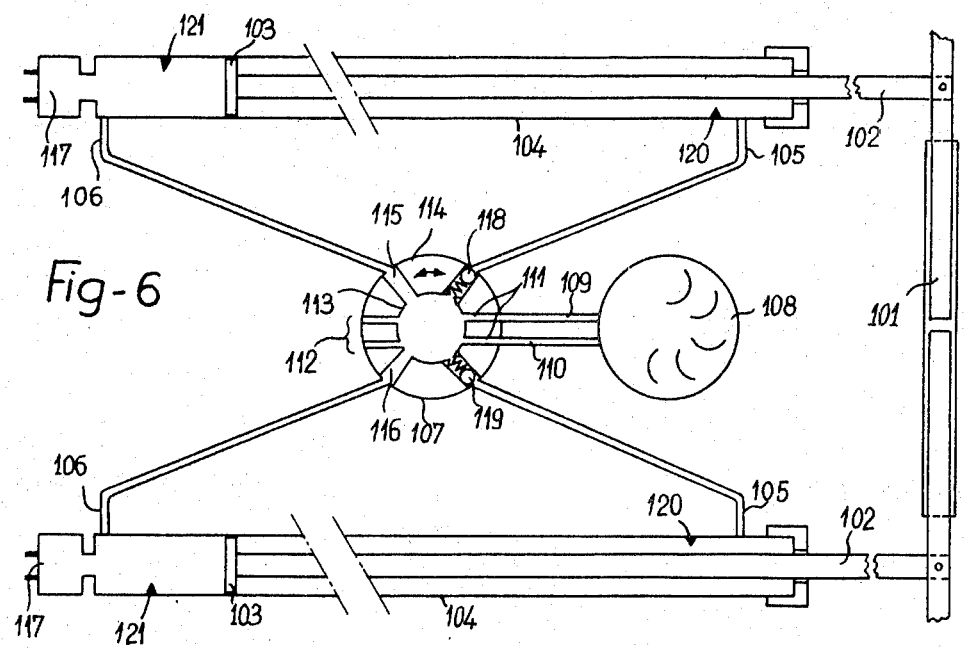
Figure 7:
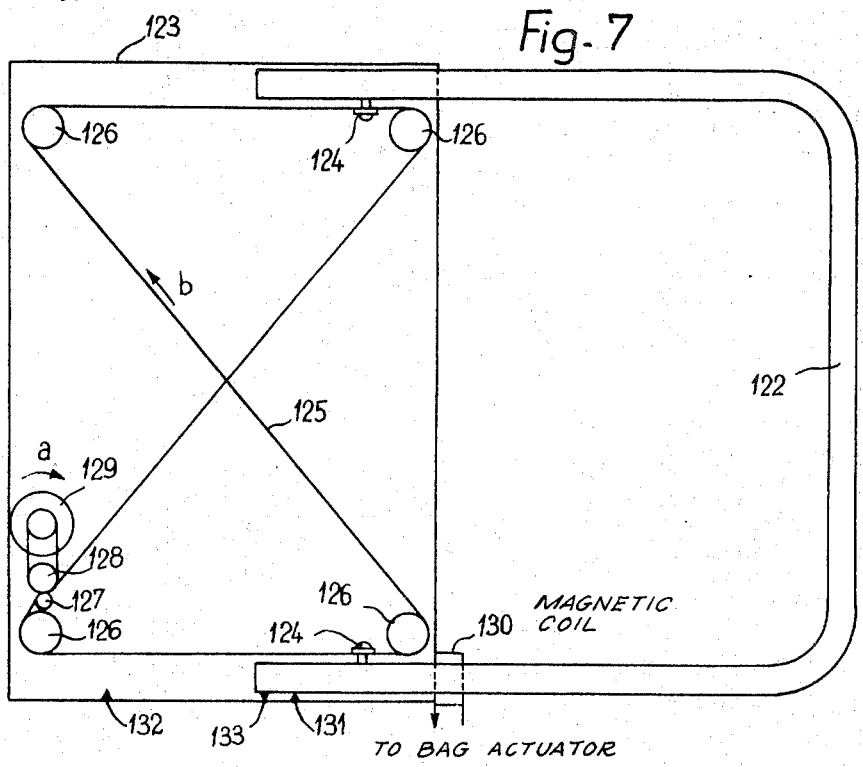

In the drawing:

FIGS. 1 and 2 are a side elevational view and a plan view from above, respectively, of the front of a motor vehicle equipped with the device of this invention, shown in its inflated condition;

FIGS. 3 to 5 illustrate modified forms of embodiment of the inflatable bags or bladders, obtained by welding or folding the four edges bounding the contour of two sheets of elastomeric material, this bag or the like being contained in a net having moderately extensible or non-extensible meshes, and FIGS. 6 and 7 illustrate obstacle detectors in hydraulic and a mechanical forms of embodiment, respectively, thereof.

FIG. 1 illustrates the device during the first stage of the energy absorption in case of head-on crash. One of the detectors 1 comprising a switch mounted at the end of an extensible member 2 is adapted to close an electric circuit controlling the expansion of an inflatable bag 4 in case of crash against an obstacle 3. FIG. 1 illustrates on the one hand the bag 4 folded in its inoperative condition in a recess 5 of the vehicle body, beneath the bumper 6, and on the other hand the bag in its inflated or operative condition.

This bag is known per se and adapted to be inflated rapidly by connecting same to a source of gas under pressure such as a nitrogen bottle carried by the vehicle.

The bag may also be inflated by using gases produced as a consequence of an explosion of substances capable of releasing a large amount of such gases.

Moreover, this bag comprises devices also known per se, capable of keeping the inner pressure of the bag at a substantially constant value nothwithstanding the continuous pressure increment produced therein as a consequence of the crash of the vehicle against an obstacle, by using for instance:

gauged valves adapted to open at a predetermined threshold value, local weak areas permitting the bursting of a predetermined surface portion of the bag having a reinforced contour, a predetermined number of leakages occurring with a predetermined output.

In its inoperative condition the bag 4 is housed in a recess 5 provided to this end at the front of the vehicle; this bag is adapted to react against a reinforced member such as a chassis member, preferably beneath the bumper 6. The bag may also be housed at the rear end of the body, if desired.

As a rule, bags of this character are disposed in clusters, as illustrated in FIG. 2, to ensure a proper protection of the complete front surface of the vehicle.

A variable number of detectors is used; they are disposed radially so that an obstacle of substantial size cannot approach the body without releasing the bag inflation system.

Thus, the variable number of detectors 1 and their collapsible and preferably telescopic rods 2 fully retracted in the inoperative condition of the vehicle can be disposed in staggered relationship.

When these rods 2 are extended or unfolded their detectors 1, according to a specific form of embodiment of this invention, may be interconnected for instance by means of a nylon yarn so as to release the inflation system even if none of these detectors were engaged directly by the obstacle. The outermost or lateral rods 2 of this assembly may form a certain angle with the longitudinal centre line of the vehicle, as illustrated in FIG. 2, or even project slightly from the sides of the vehicle body, thus affording a safer control of the bag inflation in case the crash or shock were not exactly a head-on one.

The rods 2 may be controlled manually or automatically, somewhat like a known type of radio antenna. In this case, means are provided to prevent any untimely operation of the safety device. Thus, for instance, the detectors are pulled out only beyond a predetermined speed threshold, for example as monitored by a transmission ratio corresponding to the higher speed range of the vehicle (such as the overdrive gear ratio, if any, or the top speed of the selector change-speed transmission mechanism), without excluding the provision of some manual locking system.

Improvements relating essentially to a specific type of inflatable bag or bladder may be brought in the energy absorbing device described with reference to FIGS. 1 and 2. Thus, bags comprising these improvements are illustrated in FIGS. 3 to 5, showing two modified forms of embodiment, respectively, and a detail given on a considerably larger scale, respectively, for exemplifying a local breaking point or area.

FIG. 3 illustrates a bag according to this invention in its inflated condition; this bag is obtained by welding or folding the four edges bounding the contours of a pair of sheets 11, 12 of suitable elastomer or other products such as PVC, having a thickness of the order of 0.2 mm (0.008 inch).

The inflatable bag is contained in a net 13 having inextensible or moderately extensible meshes, for example of nylon yarn, possibly braided, and adapted therefore to control or limit the maximum external volume of the inflated bag.

This assembly may be obtained by introducing the bag in its deflated condition into the net 13, through a suitably dimensioned aperture, and by partially inflating the bag to permit a proper positioning thereof in said net, as in the case of a tube in its cover.

The assembly is then deflated completely and introduced in its properly folded condition into an opening provided to this end in the vehicle body. The reference numeral 14 designates a gas generator of a type known per se, consisting either of an explosive charge capable of rapidly releasing a relatively large amount of gas or of a bottle containing compressed gas at a very high pressure.

Another economical way of obtaining the above-described bag and net assemblies consists in extruding simultaneously the sheet or tube of elastomer and the net 13 constituting the reinforcing element thereof, cemented to one face of the inner bag, the net material consisting if desired of the same or different material.

It is also possible to obtain an inflatable bag according to this invention by utilizing fabric material of relatively loose mesh or stitch pattern, coated on one face with synthetic resin. In this case, weakened areas free of any textile reinforcement and consisting only of the plastic or resin coating must be provided in the bag surface. The purpose of this modified arrangement is to permit functions similar to those illustrated in FIG. 5 and corresponding to the bags of FIGS. 3 and 4 consisting of flexible sheets reinforced by a net structure, as already described hereinabove.

In fact, some means must be provided whereby a constant internal pressure can be maintained in the bag, to a certain extent, during the crushing thereof between the obstacle and the vehicle. This function may be accomplished as a rule by different members, such as gauged valves permitting the escape of air or other gas when the internal bag pressure exceeds a predetermined threshold value. Now this involves the use of more or less reliable and expensive ancillary devices.

According to this invention and as illustrated in FIG. 5, the inner bag portions disposed between the net meshes, i.e. the non-reinforced portions, are liable to yield beyond a certain pressure value. Preferably, the bursting strength of some of these portions is further reduced on purpose at 15, for example by means of incipient break lines or cuts, punched spots or thinner areas of the bag wall, at properly selected locations of which a suitable number are distributed over the surface of the inner bags. It will be seen that the bag bursting is limited to the areas contemplated due to the presence of said reinforcing meshes (FIG. 5).

The modified form of embodiment illustrated in FIG. 4 is substantially similar to that shown in FIG. 3, except for the bag shape. In fact, this shape is parallelipipedic, so that its manufacture is greatly simplified; the configuration of the net intended for receiving this bag may be different, for instance spherical. During the inflation, the assembly assumes a roughly spherical configuration.

Generally, the shape of the net is immaterial, provided only that a sufficient absorption volume is available, the assembly having however a minimum volume in the folded condition. By way of example, a range of about 100 to 200 litres of gas in the case of a vehicle weighing 500 kg driven at 60 km/h (about 3.5 to 7 cu. ft. of gas for a vehicle weighing 1,100 lbs. at 37 m.p.h.), may be contemplated.

Of course, it would not constitute a departure from the field of this invention to use an inflatable bag of the type disclosed hereinabove inside a vehicle instead of outside, according to the technique set forth in the foregoing, or in any other applications requiring the damping of shocks between two objects of which at least one is movable.

This invention is also concerned with a specific type of detector for controlling the inflation of the protection bags. This specific type of detector is illustrated in FIGS. 6 and 7 showing two different forms of embodiment, i.e. a hydraulic form and a mechanical form, of this invention, respectively.

Referring first to FIG. 6, a detector in the form of an auxiliary bumper of simplified design is provided, consisting of a cross member 101 and a pair of longitudinal members or rods 102 extending at right angles thereto towards the interior of the vehicle; these members or rods 102 are rigid with corresponding pistons 103 slidably engaging cylinders 104, the assembly constituting a pair of hydraulic rams or cylinder-and-piston units.

These units are supplied with hydraulic fluid through a pair of pipe lines 105 and another pair of pipe lines 106 connected to the opposite ends of cylinders 104 to constitute an X-shaped network wherein the pipe ends opposed to the cylinders open into a central distributor 107 connected in turn to a pump 108 via a pair of parallel lines 109 and 110.

This distributor 107 comprises a rotary core 114 having a hollow central portion 113 and formed with a pair of parallel opposed ports 111, 112 of which the relative spacing corresponds to that of said parallel lines 109, 110; with another pair of ports 115, 116 and a pair of radial valve passages 118, 119 each provided with a non-return valve of a type known per se for normally preventing the flow of hydraulic fluid from the centre 113 of this core to the outside.

On the other hand, the ends of said units which are opposite to said detector 101 comprise pressure-responsive switch means 117 preset for operating at predetermined pressure values and connected to the inflatable bag release device.

The rotary core 114 of distributor 107 may be set in two positions, i.e. the position illustrated in FIG. 6, wherein the central cavity 113 communicates with pipe lines 106 while pipe lines 105 are closed by the valve means of ports 118, 119, and a symmetrical position in which pipe lines 106 are closed and pipe lines 105 are connected to said central cavity 113. In either position the central cavity 113 is connected to the pump 108 via the pair of ports 111 and 112.

The pump 108 is started when the position of core 114 of distributor 107 is modified, and stopped by the actuation of limit switches 120, 121 disposed between pistons 103 and the front and rear ends of cylinders 104.

The rotary core of distributor 107 is controlled manually or automatically in a manner known per se by servo action from the transmission mechanism and more particularly when a top gear or the overdrive speed is engaged, i.e. when the transmission drives the vehicle in its upper speed range.

During a drive, in the specific case of a vehicle, the assembly operates as follows:

1. The vehicle exceeds a predetermined speed threshold whereat the rotary core 114 is set in the position illustrated in FIG. 6, and the pump is driven. Fluid under pressure is introduced by the pump through pipe line 109 into the central cavity 113 of core 114, then this fluid flows through ports 115, 116 and pipe lines 106 into the relevant ends of cylinders 104. The action exerted by the hydraulic fluid on pistons 108 causes the detector 101 connected thereto to project from the vehicle until the limit switches 120 are actuated and stop the pump operation.

During this operation, the fluid contained in the front portion of the hydraulic units flows via pipe lines 105, non-return valves 118, 119 and pipe line 110 to pump 108, from which it is re-injected under pressure into pipe lines 106.

Throughout the drive, the detector 101 remains in its extended or operative position.

2. A low or zero vehicle speed the rotary core 114 is moved to its second position described hereinabove.

Thus, fluid under pressure is injected into pipe lines 105 and detector 101 is retracted into the vehicle body. The fluid expelled from the opposite ends of the hydraulic unit flows through the non-return valves and ports 118, 119 of distributor 107 into pump 108, before returning under pressure via pipe lines 105 into the cylinders of said units, until the pistons 103 engage the limit switches 121 and stop the pump operation.

3. In case of sudden crash against an obstacle while the detector is in its extended or operative position, the longitudinal members 102 recede at high speed and pistons 103 drive the hydraulic fluid at an output value greater than that afforded by the pipe lines 106, so that the pressure exerted on the pressure-responsive switches 117 rises above their related value, thus releasing the inflatable bags which expand between the obstacle and the vehicle body.

FIG. 7 illustrates the mechanical form of embodiment of the device of this invention.

The obstacle detector is constructed in the form of a bow-shaped tubular member 122 slidably mounted in a container 123 of corresponding dimensions.

The rear ends of the tubular detecting member 122 are attached by fastening members 124 to a cable 125 following a path having the pattern of a pair of isosceles triangles opposed by their apices, over loose guide pulleys 126.

One of these loose pulleys is in peripheral contact with a tension roller 127 adapted to urge the cable into the groove of a reduction pulley 128 for stepping down the velocity of rotation of the output shaft of a motor 129. This motor is either manually controlled or responsive to the transmission mechanism, as explained in connection with the first form of embodiment, the cable 125 being driven in one or the other direction according to the direction of rotation of the motor 129, so as to move the detector 122 in- or outwards.

Limit switches 131, 132 are provided in the container 123 for stopping the motor 129 when the detector 122 has completed its travel.

One inner end of said tubular bow 122 acting as a detector extends through a magnetic coil 130 carried by said container 123 and connected to the means controlling the release of said inflatable bags.

1. During the operation, when the vehicle is driven at high speed the motor 129 is energized for rotation in the direction of the arrow a, thus driving the cable 125 in the direction of the arrow b and the detector 122 outwards, until the limit switch 131 of container 123 engages its homologue 133 of detector 122, thus de-energizing the motor 129.

2. When the vehicle speed drops below a predetermined value, the motor 129 is energized for rotation in the opposite direction, thus retracting the detector 122 at low speed until the limit switch 132 of container 123 is engaged by the contact 133 of detector 122, and de-energizing and stopping the motor 129.

3. When the detector 122 is expanded to its operative position, a sudden shock against an obstacle will force this detector back rapidly. During this movement the cable adhering moderately to the various pulleys will slip thereon and thus permit the backward movement of detector 122.

The quick passage of one end of the detector, which consists for example of mild steel, through the magnetic gap of coil 130, will create a current and this current may be transmitted, previous adequate amplification, to the device controlling the release of the inflatable bags.

Of course, other modifications and variations may be brought to this invention to suit various requirements, without inasmuch departing from the basic principles of the invention as set forth in the appended claims.

What is claimed as new is:

1. An energy absorbing device for a motor vehicle comprising:
   a bag adapted to be inflated instantaneously, said inflatable bag being folded in its inoperative condition in a cavity provided in at least one end of the vehicle and adapted to react against a reinforced portion of the vehicle structure,
   inflation means to inflate said bag upon receiving a signal from a detector, and
   obstacle detector means comprising
      at least one bumper disposed in a horizontal plane with an element extending across the end of the vehicle,
      a pair of longitudinal extensions engaging said bumper and a corresponding pair of recesses of the vehicle body,
      positioning means responsive to the velocity of translation of the vehicle adapted to extend or retract said extensions at a predetermined rate with said bumper being normally retracted at low vehicle speeds,
      means responsive to the reverse movement of said bumper with respect to the vehicle to cause the release of said inflatable bags when said movement exceeds a predetermined threshold corresponding to the engagement of an obstacle by the vehicle during the movement thereof, said positioning means for extending or retracting said bumper comprising a pump adapted to deliver hydraulic fluid under an adequate pressure, said pump being connected to a distributor of the type comprising a rotary core member for directing the fluid under pressure to one or the other end of a pair of double-acting cylinders mounted parallel to the longitudinal center line of the vehicle and having their pistons rigid with said longitudinal extensions of said bumper, said cylinders slidably engaged by said pistons having their ends responsive to the overpressure created by the inward movement of said bumper connected to a gauged pressure-responsive switch adapted in turn to monitor said inflatable bag release device whereby said device can be operated at any reverse movement of the bumper in its extended or operative position which is higher than the reverse movement corresponding to said gauged value of said pressure-responsive switch.

2. An energy absorbing device for a motor vehicle comprising:

a bag adapted to be inflated instantaneously, said inflatable bag being folded in its inoperative condition in a cavity provided in at least one end of the vehicle and adapted to react against a reinforced portion of the vehicle structure, inflation means to inflate said bag upon receiving a signal from a detector, and obstacle detector means comprising at least one bumper disposed in a horizontal plane with an element extending across the end of the vehicle, a pair of longitudinal extensions engaging said bumper and a corresponding pair of recesses of the vehicle body, positioning means responsive to the velocity of translation of the vehicle adapted to extend or retract said extensions at a predetermined rate with said bumper being normally retracted at low vehicle speeds, means responsive to the reverse movement of said bumper with respect to the vehicle, to cause the release of said inflatable bags when said movement exceeds a predetermined threshold corresponding to the engagement of an obstacle by the vehicle during the movement thereof, said positioning means for extending or retracting said bumper comprising a motor driving in either direction a cable following a path having the pattern corresponding to a pair of isosceles triangles having opposed by their apices, said path being formed by suitably disposed loose guide pulleys, said cable being connected to the longitudinal extensions of said bumper which, according to the direction of rotation of said motor, is thus adapted to be moved to its operative extended position or to its inoperative retracted position, a magnetic cylindrical coil through which at least one of said longitudinal extensions consisting preferably of mild steel is adapted to move coaxially, said coil being connected to said inflatable bag release device which is operated when the reverse movement of said bumper exceeds a predetermined threshold.

* * * * *